United States Patent

Brown

[11] Patent Number: 6,056,067
[45] Date of Patent: May 2, 2000

[54] APPARATUS FOR CLEARING DEBRIS

[76] Inventor: John W. Brown, P.O. Box 1145, Boise City, Okla. 73933

[21] Appl. No.: 08/979,165
[22] Filed: Nov. 26, 1997
[51] Int. Cl.⁷ ..................................................... A01B 13/04
[52] U.S. Cl. ............................................ 172/111; 172/123
[58] Field of Search ................................ 172/111, 35, 123

[56] References Cited

U.S. PATENT DOCUMENTS

| | | |
|---|---|---|
| 3,715,872 | 2/1973 | Thompson, Jr. . |
| 4,287,955 | 9/1981 | Anderson .............................. 172/111 X |
| 4,384,618 | 5/1983 | Williams . |
| 4,518,043 | 5/1985 | Anderson et al. . |
| 4,531,589 | 7/1985 | Williams . |
| 4,802,327 | 2/1989 | Roberts . |
| 5,050,372 | 9/1991 | Heiskell . |
| 5,065,566 | 11/1991 | Gates . |
| 5,348,103 | 9/1994 | Chiddicks et al. . |

Primary Examiner—Christopher J. Novosad
Attorney, Agent, or Firm—James F. Lea, III

[57] ABSTRACT

A method and apparatus for clearing debris is disclosed. More particularly, a method and apparatus for clearing manure and other material from under a feedlot fence row is disclosed. The apparatus is preferably mounted to a vehicle such as a skid loader. The apparatus consists of a mounting structure for affixing to a vehicle, a pivotally mounted arm affixed to the mounting structure, and a motor driven wheel rotatably mounted proximate a distal end of the arm. The wheel has a plurality of teeth or shanks extending therefrom for digging out debris from under a fence row and throwing the debris away from the fence. In practice, an operator may drive a vehicle parallel to a fence row and selectively pivot the wheel in and out between fence posts to clear manure out from under the fence.

14 Claims, 6 Drawing Sheets

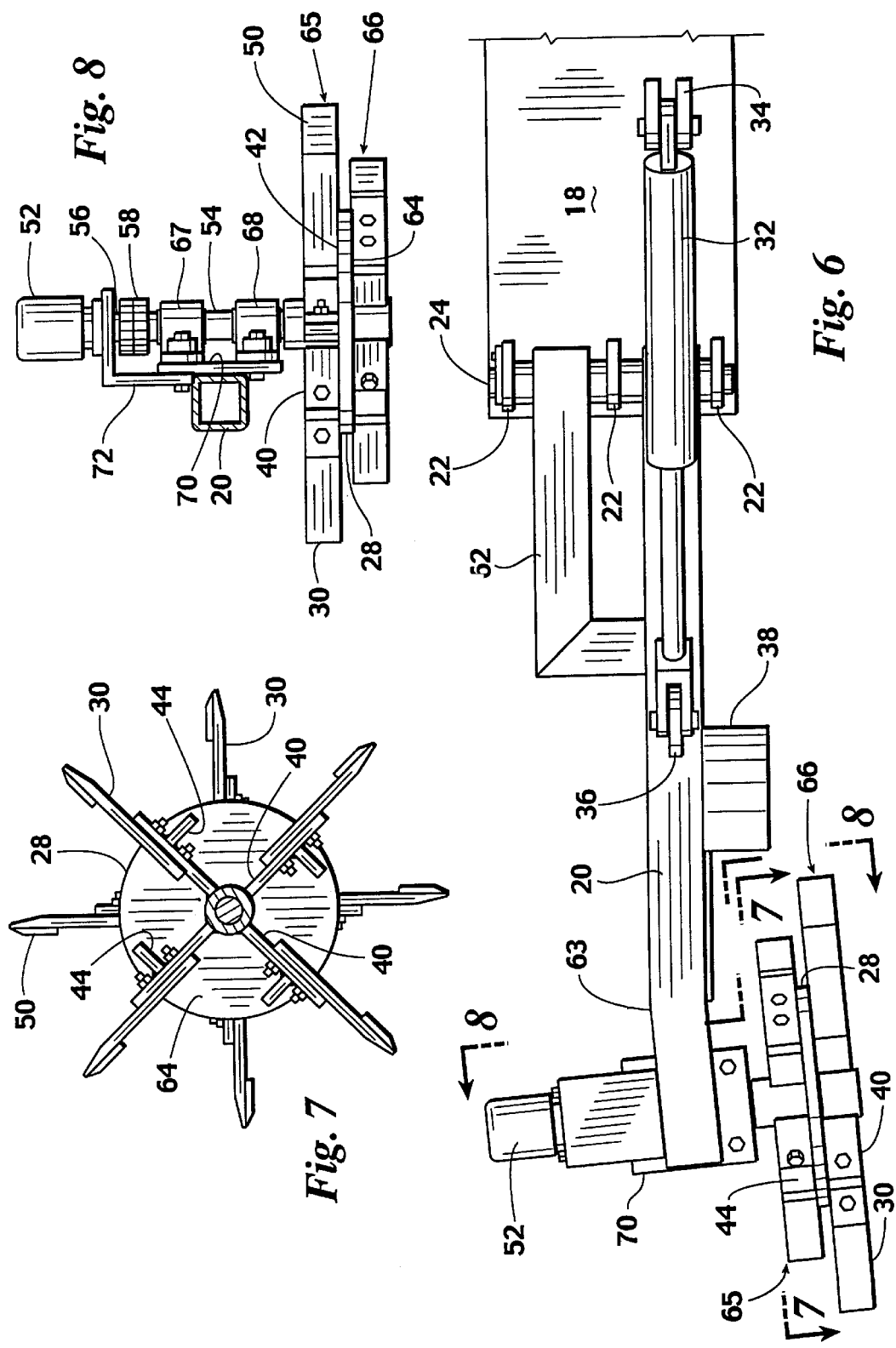

APPARATUS FOR CLEARING DEBRIS

CROSS REFERENCE TO RELATED APPLICATION

Not Applicable

TECHNICAL FIELD

This invention relates to an apparatus for clearing debris. In particular, the device is for clearing materials such as manure out from under a fence row of a feed lot.

BACKGROUND ART

A problem commonly encountered by cattle feed lot operators is the removal of material such as manure from under a fence row. The problem of removal of such material is difficult since fences encompassing feed lots are often constructed in great lengths, and require a large expenditure of time and effort to maintain. Fences encompassing feed lots are typically constructed of steel. The removal of materials such as manure from around and under a typical feed lot fence is necessitated by the fact that manure is corrosive to a metal fence.

Currently, a common method of removing materials such as manure from under a feed lot fence includes driving a tractor or other vehicle having a front mounted device, such as a blade or other device, perpendicular to the fence row to push out material from under the fence. This step must be repeated numerous times to remove material from under a length of fence. After material has been pushed out from under a fence, a separate vehicle may then scoop up the material for removal.

A disadvantage of this method of removing material from under a fence row is that it is extremely time consuming to repeatedly maneuver a vehicle perpendicular to a section of fence, drive forward to push out the material, and then back out the vehicle before aligning with another section of fence.

It is therefore desirable to utilize a device that will enable a vehicle to drive parallel to a fence row and facilitate the removal of material from under a fence. It is additionally desirable to utilize a device that is rugged in construction and is capable of removing materials having substantial mass, such as manure, dirt or other materials.

SUMMARY OF THE INVENTION

It is therefore an object of the invention to provide a device that is capable of clearing materials out from under a fence row while being mounted to a vehicle traveling parallel to the fence row.

It is a further object of the invention to provide a device capable of removing substantially heavy materials such as dirt or manure from under a fence row.

It is a further object of the invention to provide a rotating wheel having rigid teeth mounted thereon wherein the wheel is adjustable in horizontal and vertical directions.

It is an additional object of the invention to provide a method for clearing materials from under a fence row that is substantially less time consuming than currently practiced methods.

The apparatus of the invention includes a mounting structure for affixing to a vehicle such as a Case model 1838, which is commonly known as a skid loader. Pivotally mounted to the mounting structure is an arm that extends forward of the vehicle and preferably pivots to one side of the vehicle. Rotatably mounted to a distal end of the arm is a wheel. A mover, such as a hydraulic cylinder, is affixed to the mounting structure and the arm for selectively pivoting the arm and wheel either in front of or to a side of the vehicle. The wheel has a plurality of rigid teeth extending from its perimeter for engaging materials such as manure or dirt and for removing the material from under a fence. Examples of other uses for the invention include removing dirt away from barbed wire fences, removing dirt away from buildings, throwing dirt up against a building to maintain a drainage grade, leveling ground in restricted areas as well as open spaces, defining sharp and accurate vertical cuts for curbs, railroad ties, etc, positioning rock and soil back on trails to help prevent erosion, replacing gravel around oil tank overflow dikes, maintaining alleys or other dirt roads, cutting drainage around culverts and bridges, filling sprinkler wheel tracks, cutting water drainage trenches, clearing sagebrush and for forestry and horticulture purposes, including cutting cedar trees for removal from the ground. Preferably the wheel is driven by a reversible motor of sufficient power to throw material approximately ten feet away from the fence where it may be easily collected thereafter.

BRIEF DESCRIPTION OF THE DRAWINGS

FIG. 6 is a side view of the apparatus of the invention.

FIG. 7 is a bottom view of the wheel of the invention.

FIG. 8 is a side view of the motor and wheel assembly of the invention.

DETAILED DESCRIPTION OF THE PREFERRED EMBODIMENTS

Figure 1:
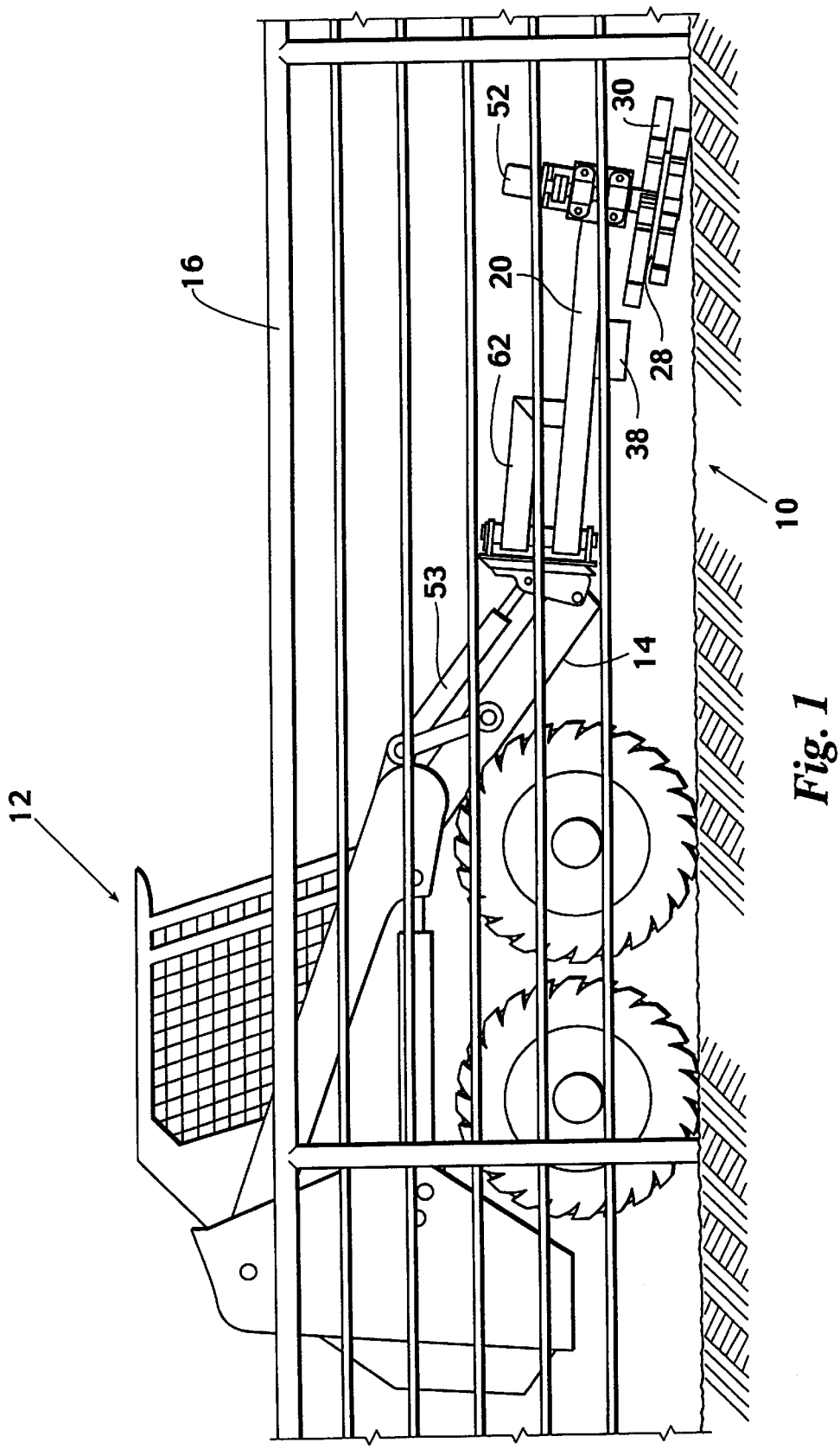
FIG. 1 is an elevation view of the apparatus of the invention affixed to a vehicle shown removing materials from under a typical feed lot fence.

Referring now to FIG. 1, designated generally 10 is the apparatus of the invention. Apparatus 10 is shown mounted on vehicle 12. Preferably, vehicle 12 is a skid loader such as Model 1838 manufactured by Case. Skid loaders are desirable since they have raisable stingers or arms 14 which permit vertical adjustment of apparatus 10. However, other types of vehicles may be utilized effectively with apparatus 10 including tractors or other vehicles. Apparatus 10 is shown removing material from under fence 16 in FIG. 1.

Figure 2:
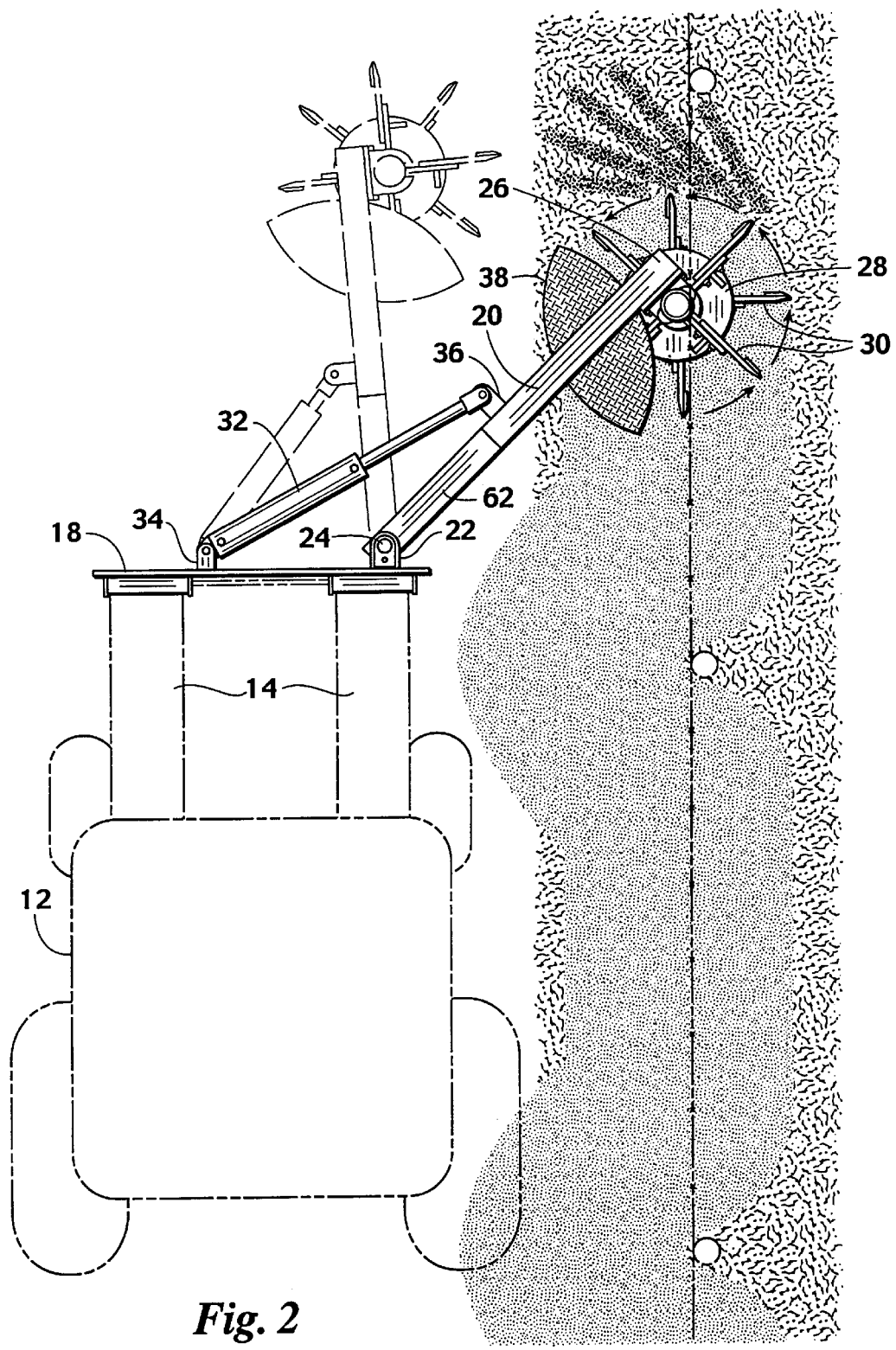
FIG. 2 is a top view of the vehicle and apparatus wherein the arm of the apparatus is shown in a side or fence line engaging position and is also shown in a forward most position in phantom lines.

Referring now to FIG. 2, mounting structure 18 is affixed to raisable arms 14 of vehicle 12. In the preferred embodiment, mounting structure 18 is a steel plate of ½ inch thickness, which is 18 inches high by 48 inches wide. However, other materials and dimensions for mounting structure 18 may be utilized. Pivotally mounted to mounting structure 18 is arm 20. Arm 20 is pivotally mounted to mounting structure 18 by arm mount 22. In the preferred embodiment, arm mount 22 is constructed of three ¾ inch×4 inch strap irons that are welded to mounting structure 18. Preferably, the strap irons of arm mount 22 have a 2 inch hole for accommodating pin 24, which is 2 inches in diameter. In the preferred embodiment, the strap irons of arm mount 22 have ½ inch walled bushing stock positioned therein for engaging pin 24.

In the preferred embodiment, arm 20 is 5 feet long and is constructed of 4 inch square steel tubing. Rotatably mounted on distal end 26 of arm 20 is wheel 28. Affixed to wheel 28 is a plurality of rigid shanks or teeth 30. Teeth 30 may be subsoil shanks, bull tongues, paddles, chisel blades, slicers or other suitable protuberances. Affixed to mounting structure 18 is a mover for selectively pivoting arm 20. The mover may be a hydraulic cylinder 32 or other device for pivoting arm 20 including electric or gasoline powered motors, other piston-cylinder devices, a chain drive or other devices. In the preferred embodiment, hydraulic cylinder 32 is affixed to mounting structure 18 by mounting structure pivot 34. Preferably, hydraulic cylinder 32 is affixed to arm 20 by arm pivot 36. In a preferred embodiment, shield 38 is affixed to arm 20 to prevent materials such as dirt, rocks or manure from being thrown at an operator of vehicle 12.

Figure 3:
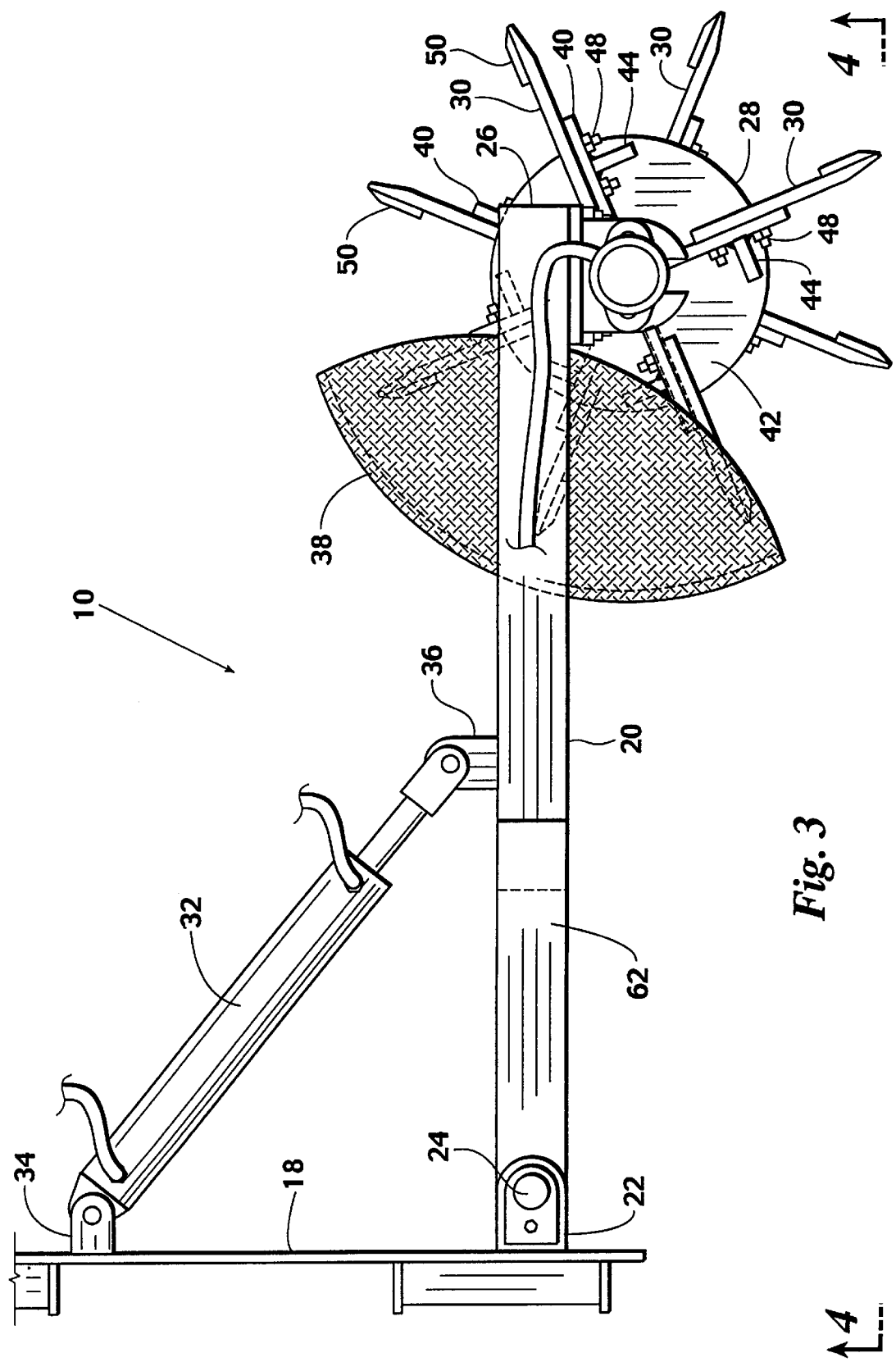
FIG. 3 is a top view of the invention.

Referring now to FIG. 3, shown is a more detailed top view of the apparatus 10. Wheel 28 is shown mounted proximate distal end 26 of arm 20. A plurality of strap iron segments 40 are preferably welded to upper surface 42 of wheel 28. Additionally, gussets 44 are preferably welded at right angles to strap iron segments to reinforce strap iron segments 40. Gussets 44 are preferably 2 inches×2 inches×½ inch. In the preferred embodiment, teeth 30 are removably affixed to strap iron segments 40 by means of nuts and bolts 48. Teeth 30 have carbide tips 50 to increase the service life of teeth 30. It is desirable for teeth 30 to be removably attached to strap iron segments 40 so that teeth 30 may be easily replaced when they wear out.

Motor 52 is preferably mounted above wheel 28 for rotating wheel 28 and teeth 30. Preferably, motor 52 is of sufficient power to rotate wheel 28 at 500–600 rpm. Additionally, motor 28 should be powerful enough to dig out debris and throw the debris approximately 10–12 feet. A preferred motor for use with the invention is a hydraulic orbital motor. In one embodiment, a grater blade may be provided on the bottom of arm 20 for scraping debris into a uniform longitudinal pile for facilitating easy clean up by a scooping vehicle.

Figure 4:
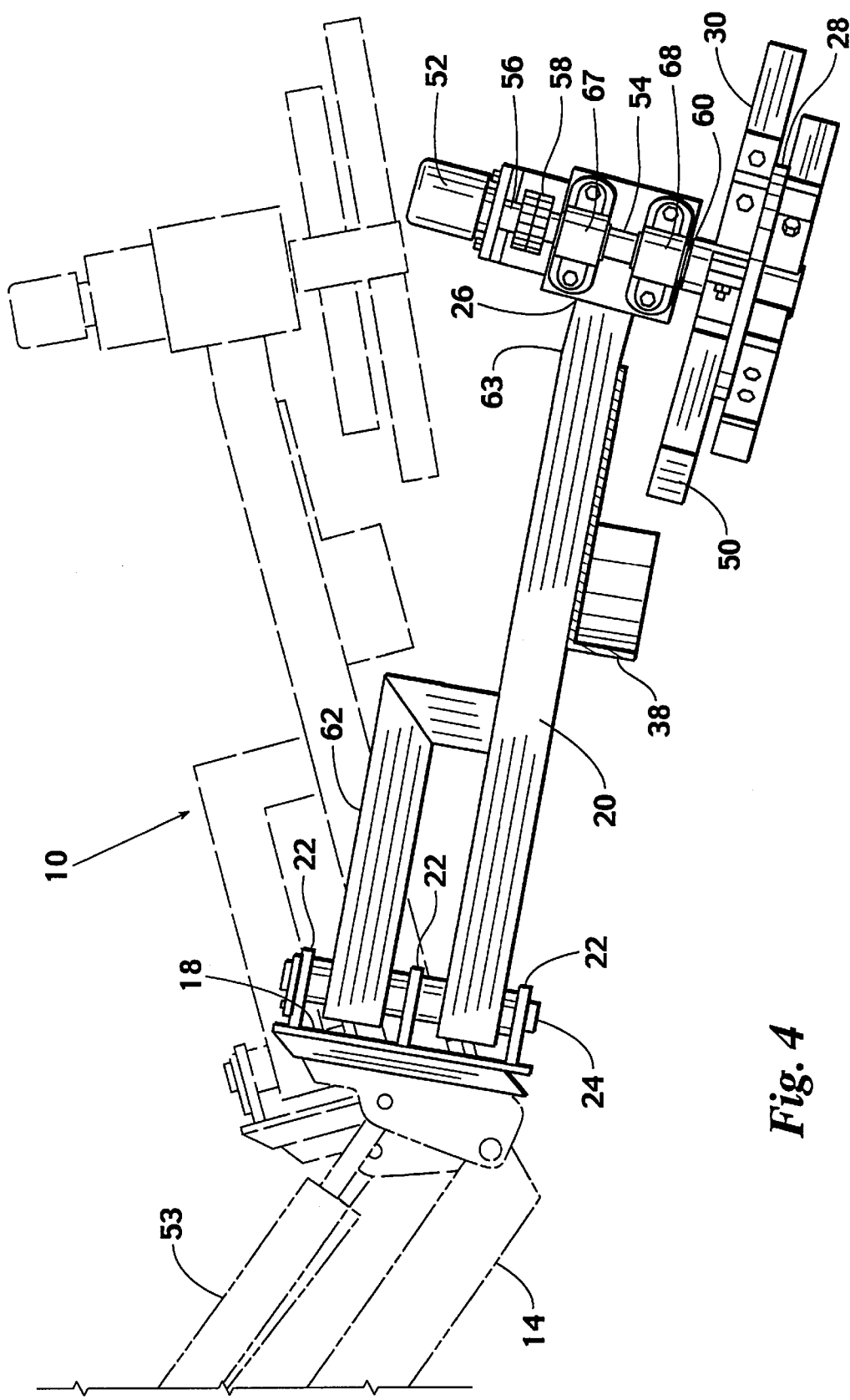
FIG. 4 is a side view of the invention showing the apparatus in a lower position. A raised position is shown in phantom lines.

Referring now to FIG. 4, shown is a side view of apparatus 10. Shown in phantom lines is apparatus 10 in a raised position. Additionally, shown in phantom lines is raisable arm 14 of vehicle 12. In addition to having raisable arm 14, a preferred vehicle has hydraulic cylinder 53 for tilting mounting structure 18 at a desired angle. It is desirable to mount apparatus 10 on a vehicle having a raisable arm 14 so that apparatus 10 may be selectively vertically adjustable. The ability to vertically adjust apparatus 10 aids in the removal of debris found on or near uneven ground that may be encountered in the field.

In the preferred embodiment, motor 52 engages wheel shaft 54 by means of a double sprocket arrangement wherein one sprocket is affixed to wheel shaft 54 and a second sprocket is affixed to motor shaft 56. Preferably, the sprockets affixed to wheel shaft 54 and motor shaft 56 are 16 teeth sprockets connected by double chain 58. Preferably double chain 58 is a No. 60 double chain. To prevent damage to motor 52, wheel 28 is affixed to wheel shaft 54 by means of shear bolt 60. In preferred embodiment, shear bolt 60 is a ⅝" shear bolt.

Visible in FIG. 4 is auxiliary arm 62. Auxiliary arm 62 is provided to add additional strength to arm 20 of apparatus 10. Auxiliary arm 62 is preferably 2 feet in length. Arm 20 is provided with downward bend 63 so that teeth 30 of wheel 28 more readily engage the ground. Without bend 63, rotating wheel 28 operates in a plane substantially parallel to the surface of the ground. In the preferred embodiment, downward bend 63 is a 5 degree bend positioned 12" from distel end 26 of arm 20.

Figure 5:
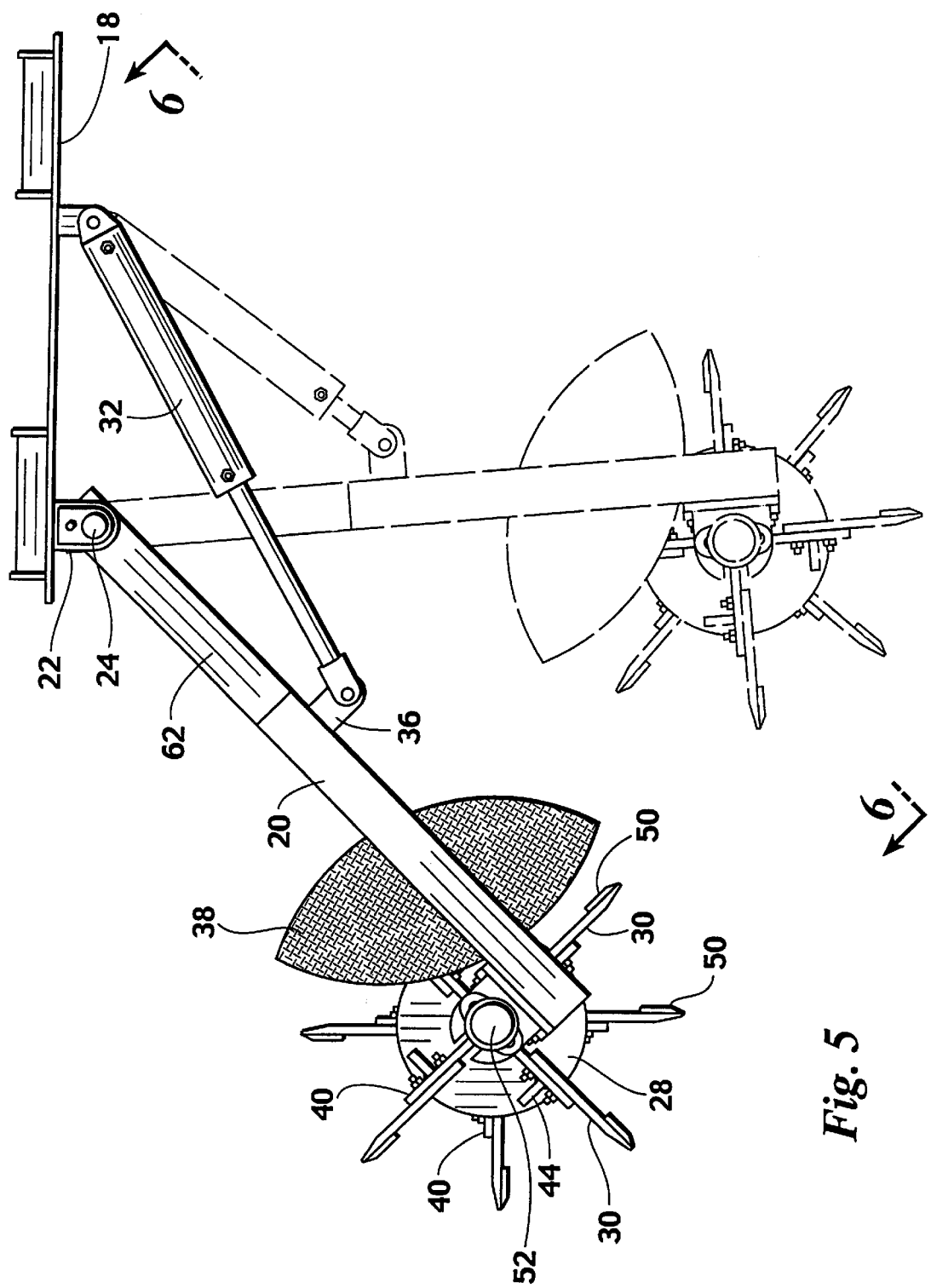
FIG. 5 is a top view of the invention showing the arm in a side or fence line engaging position. Additionally, the arm is shown in a forward most position in phantom lines.

Referring now to FIG. 5, shown is arm 20 of apparatus 10 in a side or fence engaging position. Arm 20 is further shown in a forward position with phantom lines. Hydraulic cylinder 32 is provided to selectively pivot arm 20 to a desired location. Preferably, hydraulic cylinder 32 is a 3 inch diameter cylinder having a 20 inch stroke. In the preferred embodiment, hydraulic arm pivot 36 is 25" away from pin 24, thereby allowing for an approximately 90 degree swing of arm 20.

Referring now to FIGS. 6–8, a side view, a bottom view and a detailed side view of wheel 28 is shown. Strap iron segments 40 are positioned on both upper surface 42 and lower surface 64 of wheel 28. In the preferred embodiment, four segments of strap iron 40 are welded at right angles to upper surface 42 and four pieces of strap iron 40 are welded to lower surface 64 of wheel 28. The resulting assembly allows for teeth 30 to be affixed to strap iron segments 40 at 45 degree intervals. By affixing teeth 30 to both upper surface 42 and lower surface 64 of wheel 28, an effective cutting area is doubled in width. Upper row 65 and a lower row 66 of teeth 30 each engage material to be removed rather than a single row of teeth.

Wheel shaft 54 is guided by an upper shaft guide 67 and lower wheel shaft guide 68. Wheel shaft 54 is shown in FIG. 8 affixed to wheel mount plate 70. Motor mount plate 72 is provided to support motor 52.

In the preferred embodiment, hydraulic solenoid valves are electrically controlled for operating apparatus 10. Preferably one system is provided for facilitating control of arm 20 and a separate system is provided to control hydraulic motor 52. In the preferred embodiment, a dead switch is provided for the operator, which must be depressed to maintain rotation of wheel 28. It should be understood, however, that other means of controlling apparatus 10 may be provided within the scope of the invention.

In practice, apparatus 10 is affixed to vehicle 12. Vehicle 12 is driven parallel to a fence row and arm 20 is selectively pivoted by hydraulic cylinder 32 to position wheel 28 under a fence or to position wheel 28 in front of vehicle 12 to avoid impacting teeth 30 on a fence post or other obstacle. Wheel 28 may be vertically adjusted via raisable arms 14 if vehicle 12 is equipped with raisable arms 14. Wheel 28 may also be horizontally adjusted by hydraulic cylinder 32. Therefore, an operator may easily position wheel 28 to effectively clear material out from under a fence row with teeth 30 on rotating wheel 28.

The invention has significant advantages. The invention allows an operator to clear out materials from below a fence in a greatly reduced amount of time. The ability to maneuver a vehicle parallel to a fence line eliminates significant vehicle maneuvering and should allow an operator to complete a fence clearing job with less effort.

While the invention has been shown in only one of its forms, it should be apparent to those skilled in the art that the invention is not so limited but is susceptible to various changes without departing from the scope of the invention. For example although the arm is shown controlled by hydraulic cylinder, other means may be used to position the arm. Additionally, although a hydraulic motor is shown powering the rotation of the wheel, other types of motors or methods of impairing rotation to wheel 28 may be utilized.

I claim:

1. An apparatus for clearing debris comprising:
   a mounting structure for affixing to a vehicle;
   an arm pivotally mounted to said mounting structure, said arm having a distal end;
   a mover for selectively pivoting said arm;
   a wheel mounted proximate said distal end of said arm, said wheel having a top, a bottom and a perimeter;
   a plurality of rigid teeth mounted on said wheel and extending from said perimeter of said wheel; and
   a motor operatively engaged with said wheel for rotating said wheel.

2. The apparatus according to claim 1 wherein said rigid teeth are mounted on said top of said wheel and on said bottom of said wheel for increasing an effective clearing area.

3. The apparatus according to claim 1 wherein said arm has a downward bend for facilitating a downward engagement of said teeth with a surface.

4. The apparatus according to claim 1 wherein said mover for selectively pivoting said arm is a hydraulic cylinder, said hydraulic cylinder pivotally mounted to said mounting structure at a first end and pivotally mounted to said arm at a second end.

5. The apparatus according to claim 1 wherein said rigid teeth are comprised of detachable shanks.

6. The apparatus according to claim 1 wherein said motor is mounted proximate said distal end of said arm.

7. An apparatus comprising:
   a mounting structure for affixing to vertically adjustable arms of a vehicle;
   an arm pivotally mounted to said mounting structure, said arm having a distal end;
   a mover for selectively pivoting said arm;
   a wheel rotatably mounted proximate said distal end of said arm, said wheel having a top, a bottom and a perimeter;
   a plurality of rigid teeth mounted on said wheel and extending from said perimeter of said wheel;
   a motor operatively engaged with said wheel for rotating said wheel.

8. The apparatus according to claim 7 wherein said rigid teeth are mounted on said top of said wheel and on said bottom of said wheel for increasing an effective clearing area.

9. The apparatus according to claim 7 wherein said arm has a downward bend for facilitating a downward engagement of said teeth with a surface.

10. The apparatus according to claim 7 wherein said mover for selectively pivoting said arm is a hydraulic cylinder, said hydraulic cylinder pivotally mounted to said mounting structure at a first end and pivotally mounted to said arm at a second end.

11. The apparatus according to claim 7 wherein said rigid teeth are comprised of detachable shanks.

12. The apparatus according to claim 7 wherein said motor is mounted proximate said distal end of said arm.

13. A method of removing material from under a fence row, said method comprising the steps of:
    driving a vehicle parallel to a fence row;
    selectively pivoting an arm having a rotating wheel mounted on a distal end of said arm, said rotating wheel having rigid teeth affixed thereto and extending from a perimeter thereof, said step of selectively pivoting said wheel for positioning said wheel under said fence row and for avoiding contact between said wheel and a fence post; and
    clearing material out from under the fence row with said rotating wheel.

14. The method according to claim 13 further comprising a step of selectively adjusting a height of said wheel by adjusting vertically adjustable arms on the vehicle.

* * * * *